United States Patent
Mukai et al.

(10) Patent No.: US 8,179,079 B2
(45) Date of Patent: May 15, 2012

(54) ROTATION ANGLE DETECTION DEVICE AND ELECTRIC POWER STEERING APPARATUS EMPLOYING THE SAME

(75) Inventors: Yoshinobu Mukai, Saitama (JP); Hiroaki Horii, Saitama (JP); Fumihiro Morishita, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 616 days.

(21) Appl. No.: 11/475,109

(22) Filed: Jun. 27, 2006

(65) Prior Publication Data

US 2006/0288800 A1     Dec. 28, 2006

(30) Foreign Application Priority Data

Jun. 28, 2005   (JP) ............................. P.2005-187857

(51) Int. Cl.
*G05B 1/06*     (2006.01)
(52) U.S. Cl. ............... 318/661; 318/489; 318/254.1; 318/605
(58) Field of Classification Search .......... 318/489, 318/254, 605, 661, 638, 648, 254.1
See application file for complete search history.

(56) References Cited

U.S. PATENT DOCUMENTS

| | | | | |
|---|---|---|---|---|
| 5,469,032 A * | 11/1995 | Otake | ...... | 318/400.21 |
| 6,191,550 B1 * | 2/2001 | Yoshihara | ...... | 318/661 |
| 6,679,350 B2 * | 1/2004 | Shimizu et al. | ...... | 180/446 |
| 6,810,986 B2 * | 11/2004 | Takagi | ...... | 180/446 |
| 7,154,404 B2 * | 12/2006 | Sato | ...... | 318/400.21 |
| 7,355,826 B2 * | 4/2008 | Ochiai et al. | ...... | 361/23 |
| 7,388,527 B2 * | 6/2008 | Kushihara | ...... | 341/114 |

FOREIGN PATENT DOCUMENTS

| | | |
|---|---|---|
| JP | 61-076910 | 4/1986 |
| JP | 2002-310727 | 10/2002 |
| JP | 2003-39336 A | 2/2003 |
| JP | 2005-077227 | 3/2005 |

OTHER PUBLICATIONS

Eiji Koyanagi; Ohm Co., Ltd.; Robot Sensor Guide; Apr. 20, 2004; p. 58.

* cited by examiner

*Primary Examiner* — Walter Benson
*Assistant Examiner* — David Luo
(74) *Attorney, Agent, or Firm* — Arent Fox LLP

(57) ABSTRACT

The rotation angle detection device detects the rotation angle of a rotary member by employing, at the least, either a sine wave signal or a cosine wave signal that is generated as the rotary member is rotated, and employs a change per unit time in the sine wave signal or cosine wave signal to determine whether an output abnormality has occurred in the rotation angle detection device. Further, this rotation angle device is employed to detect the motor angle of an electric power steering apparatus.

5 Claims, 5 Drawing Sheets

ROTATION ANGLE DETECTION DEVICE AND ELECTRIC POWER STEERING APPARATUS EMPLOYING THE SAME

This application claims foreign priority based on Japanese Patent application No. 2005-187857, filed Jun. 28, 2005, the content of which is incorporated herein by reference in its entirety.

BACKGROUND OF THE INVENTION

1. Field of the Invention

The present invention relates to a rotation angle detection device that outputs a sine wave signal or a cosine wave signal relative to an angle, and an electric power steering apparatus that employs this detection device.

2. Description of the Background Art

To exercise position control or speed control by employing a motor, the rotational position of the shaft of the motor is detected. A method to detect the rotational aspect is a rotary encoder or a potentiometer. In particular, a non-contact potentiometer that employs the magneto-resistive effect of a semiconductor and outputs a sine wave signal is used as a sensor (see Robot Sensor Guide, by Eiji Koyanagi, Ohm Co., Ltd., Apr. 20, 2004, p. 58).

An electric power steering apparatus is an apparatus that transmits to a steering system an auxiliary torque generated by a motor, and reduces steering-wheel torque. The rotation angle of the motor shaft is detected by employing a resolver, which controls the motor. In Japanese Patent Unexamined Publication No. JP-A-2000-39336 (claims 1 and 2, and paragraph 0005), an example resolver is disclosed wherein a secondary winding is coupled with a primary winding through which a sinusoidal current is supplied, and a change in the rotation angle is output as an angle modulation signal of the sinusoidal current. According to this technique, an operation for determining whether a resolver output abnormality has occurred is performed based on the symmetry between the top and the bottom of the amplitude of the sine wave that is output. Further, another method is also disclosed whereby a difference between the maximum value and the minimum value of the sine wave that is output is employed to detect a sticking fault, which is when the output of the sensor is fixed to a specific value. In addition, a method is also described for calculating the sum of the squares of a sine wave signal and a cosine wave signal to detect a disconnection (see Robot Sensor Guide, cited above).

However, according to the technique in JP-A-2000-39336, whereby an operation for determining the occurrence of an abnormality is performed by using the values of a sine wave signal and a cosine wave signal, noise would be superimposed on the signals. Thus, a predetermined detection margin is required, and an abnormality can not be detected unless the abnormal state continues for an extended period of time.

Further, when the detection method is used to calculate the sum of the squares, a reliable detection process can not be performed when the values of the sine wave signal and the cosine wave signal are not greatly changed.

In addition, since the values of the sine wave signal and the cosine wave signal may be "0", a predetermined elapsed period of time is also required in order to determine whether the current state is a sticking fault wherein the output is fixed to a specific value.

SUMMARY OF THE INVENTION

The objective of the present invention, therefore, is to provide a rotation angle detection device and an electric, power steering apparatus that employs this detection device wherein the detection device reduces the dependency of the abnormality determination operation on the intensity of a signal, and shortens the period of time required to determine whether an output abnormality has occurred.

To achieve this objective, according to the invention, there is provided a rotation angle detection device comprising:

a signal generating unit which generates a sine wave signal and a cosine wave signal as a rotary member is rotated;

a rotation angle detection unit which detects a rotation angle of the rotary member, in accordance with the sine wave or the cosine wave signal;

an abnormal determining unit which determines whether an output abnormality has occurred in the rotation angle detection unit based on a change in the sine wave signal or the cosine wave signal per unit time.

Since an operation for determining whether an output abnormality has occurred is performed based on a change in a sine wave signal or in a cosine wave signal per unit time, i.e., based on a derivative value, the performance of the operation does not depend on the intensity of the sine wave signal or the cosine wave signal. Therefore, an abnormality in the rotation angle detection apparatus per unit time can be detected at an arbitrary time for a sine wave signal or a cosine wave signal.

According to the invention the abnormality may be determined when the change is beyond a predetermined range for more than a predetermined time. With this arrangement, an erroneous operation due to noise can be avoided.

In the rotation angle detection device, during determining the abnormality by using the sine wave signal and the cosine wave signal, when either the change in the sine wave signal per unit time or the change in the cosine wave signal per unit time is equal to or smaller than a first predetermined value, a check may be performed to determine whether the change in the other signal is equal to or greater than a second predetermined value.

When an angle of 360 degrees is defined as a cycle for a sine wave signal, a change per unit time is small near 90 degrees while it is large for a cosine wave signal. Near 0 degrees, a change in the cosine wave signal is small but a change in the sine wave signal is large. That is, when a change in the cosine wave signal or the sine wave signal is small, a large change can be detected in the other wave signal. As a result, the detection process can be performed in an area near where the value output is "0", wherein it is difficult for the current state to be distinguished because of sticking faults. In this case, a sine wave signal and a cosine wave signal are generated, for example, by applying a rotating magnetic field which is rotated in consonance with the rotation of the rotary member, to two coils that orthogonally intersect each other.

Further, according to the invention, there is provided an electric power steering apparatus for driving a motor in accordance with an externally inputted guidance and for providing auxiliary steering for a vehicle comprising:

a steering wheel to which a manual steering torque is inputted;

a motor which is driven by a power source in accordance with the manual steering torque so as to enhance the manual steering torque; and the rotation angle detection device according to claim 1 for detecting the rotation angle of the motor.

According to this invention, a rotation angle detection device, which reduces dependence on the intensity of a signal and shortens the period required for the operation for determining whether an abnormality has occurred, and an electric power steering apparatus that employs this detection device can be provided.

DESCRIPTION OF THE PREFERRED EMBODIMENTS

First Embodiment

Figure 1A:
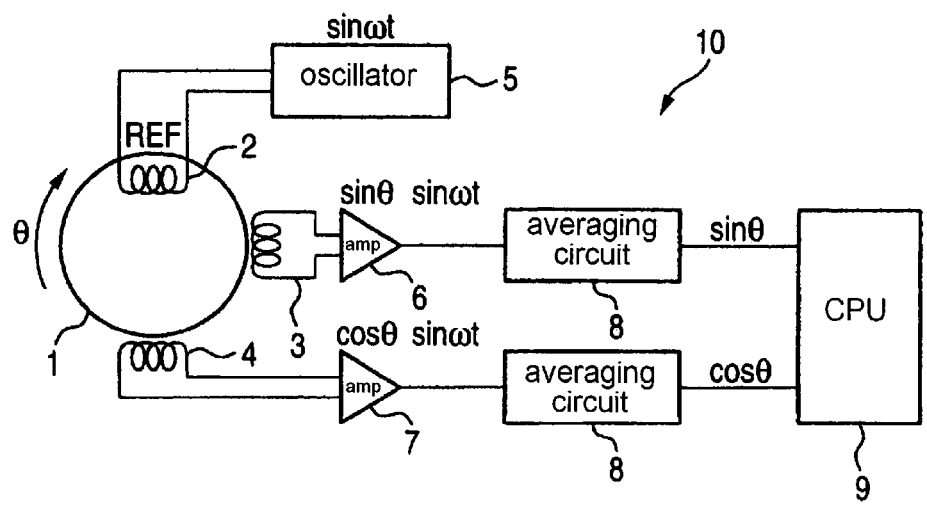
FIG. 1A is a diagram showing the hardware configuration of a rotation angle detection device according to a first embodiment of the present invention.

While referring to FIG. 1A, an explanation will be given for the hardware configuration of a resolver (a rotation angle detection device) 10 that detects the rotation angle of a motor employed to augment the force exerted by an electric power steering apparatus.

The resolver 10 includes, as its main components: a rotor 1 which interacts with the rotary shaft of the motor; a primary coil 2 and two secondary coils 3 and 4; an oscillator 5 for driving the primary coil 2; and amplifiers 6 and 7 which amplify the output of the secondary coils 3 and 4. The resolver 10 further includes averaging circuits 8 and a CPU unit 9.

The primary coil 2 is peripherally located around rotor 1 and a sinusoidal current sin ωt having an angular frequency ω is supplied using oscillator 5. The two secondary coils 3 and 4 of a solenoid type, are provided for the fixed shafts of the resolver 10, and axes of the solenoids orthogonally intersect each other.

As a rotation angle θ of the rotor 1 is changed, the magnetic field generated by the primary coil 2 rotates. Due to this rotating magnetic field, a modulated signal of sin θ sin ωt is output to the amplifier 6 connected to secondary coil 3, and a modulated signal of cos θ sin ωt is output to the amplifier 7 connected to secondary coil 4. Then, when time-averaging calculations are performed for these modulation signals using the averaging circuits 8, a sine wave signal sin θ and a cosine wave signal cos θ are obtained. In such a case it is assumed that the angular frequency ω of the oscillator 5 is much larger than the rotation angle frequency of the rotor 1. It should be noted that the CPU unit 9 includes an A/D converter and several memories, such as a ROM and a RAM.
In the present invention, the above structures 5, 6, 7 and 8, which generate sine or cosine wave signal are referred as a signal generating unit.

Figure 1B:
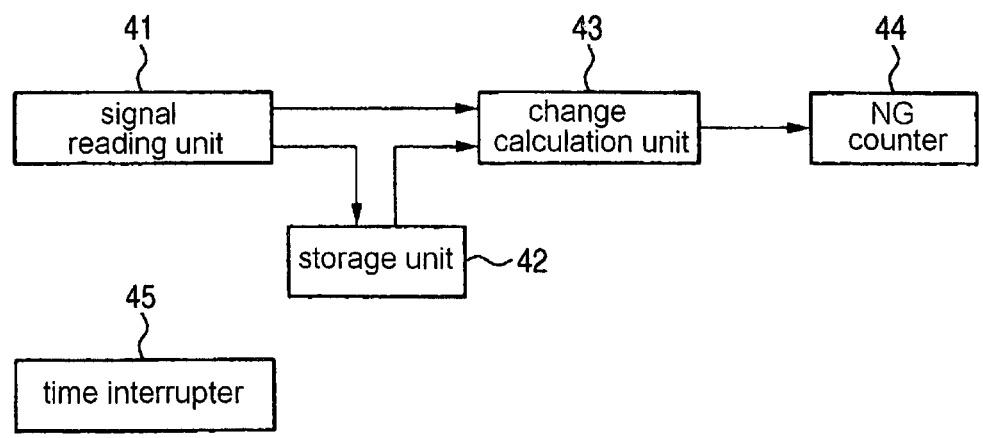
FIG. 1B is a diagram showing an algorithm structure according to a first embodiment of the present invention.

By employing the CPU unit 9, A/D conversion and computation processing are sequentially performed for either the sine wave signal or the cosine wave signal. An overview of this processing will now be explained while referring to the algorithm structure diagram in FIG. 1B. In this algorithm structure diagram, the structure of a program stored in the memory and the transfer of data are shown.

A signal reading unit 41 employs the A/D converter to read the value of a sine wave signal sin θ or a cosine wave signal cos θ, and stores the value of the signal in a storage unit 42. After a predetermined period of time has elapsed, the value of the sine wave signal sin θ or the cosine wave signal cos θ read by the signal reading unit 41 is compared with the value of the sine wave signal sing or the cosine wave signal cos θ stored in the storage unit 42, and a change per unit time is calculated by a change calculation unit 43. An NG counter 44 periodically counts instances wherein the change is equal to or smaller than a predetermined value, and when the count is smaller than a predetermined value, the current state is regarded as the normal state. However, when the count exceeds the predetermined value, it is determined that a fault has occurred in the current state. These processes are periodically performed by using a timer interrupter 45. In the present invention, the unit 41 is referred as rotation angle detection unit, also, the unit 42 through 44 are referred as an abnormality determining unit.

Figure 2:
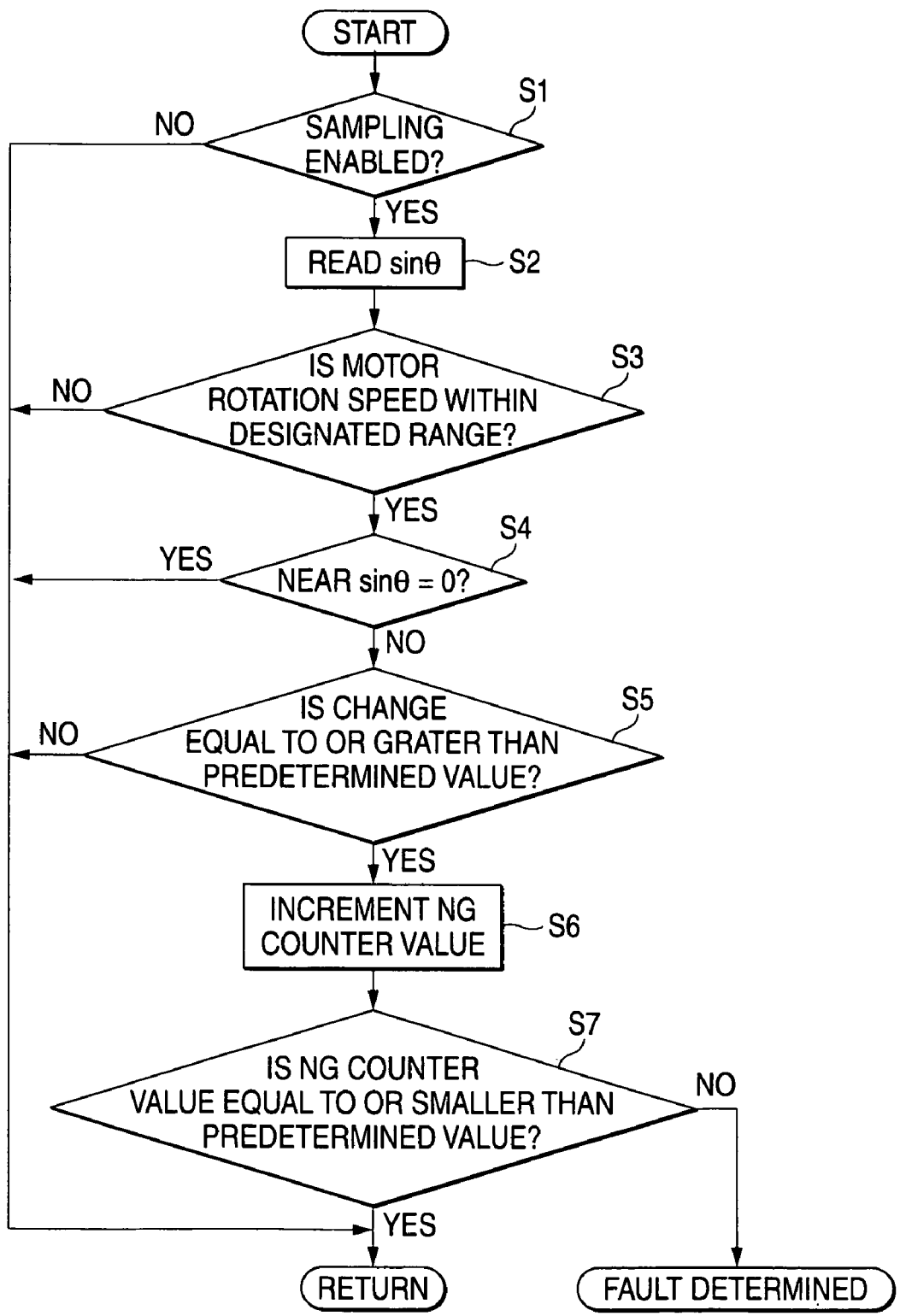
FIG. 2 is a flowchart showing the rotation angle detection device according to the first embodiment.

The operation for determining the occurrence of a resolver 10 (a rotation angle detection device) abnormality will now be described while referring to the flowchart in FIG. 2. The value of the sine wave signal sin θ that was previously read and the value obtained by the NG counter 44 are stored in the memory, and in consonance with the timer interrupter 45, the processing shown in FIG. 2 is cyclically performed every 1 msec.

At step S1, a check is performed to determine whether sampling of the sine wave signal sin θ and the cosine wave signal cos θ is possible. For example, when spike noise produced by another apparatus causes the values sin θ sin ωt and cos θ sin ωt output by the secondary coils 3 and 4 to be outside a predetermined range, sampling of the outputs of the secondary coils 3 and 4 is canceled. When, sampling is performed normally, the decision at step S1 is "YES" and the processing advances to step S2.

At step S2, the reading of a new sine wave signal sin θ is performed, and the A/D converter sequentially converts into digital signals sine wave signals sin θ at four points, that is, every 250 μsec. Following this, the processing advances to step S3, and a check is performed to determine whether the rotational speed of the motor is within a designated range. For example, when the motor is rotating at high speed, and the period for the rotation of the motor at a predetermined angle is shorter than a sampling interval, the accuracy at which a change in the rotation angle can be measured is reduced. On the other hand, when the motor is halted, detecting a time change is not possible. Therefore, in order to eliminate these states, it is determined whether the motor rotational speed is within the designated range. When the motor rotational speed is outside the designated range, the decision at step S3 is "YES", and the processing advances to step S4.

At step S4, a check is performed to determine whether the sine wave signal sin θ is near sin θ=0. When the sine wave signal sin θ is near "0", the current state can not be identified as being either the normal state or a sticking fault (which is when the output is fixed to a specific value) so such a state should be avoided. In this case, being near "0" indicates, for example, that there is range of ±300 mV for a sine wave signal sin θ having an amplitude of ±5V. When the sine wave signal sin θ is not near "0", the decision at step S4 is "NO" and the processing advances to step S5.

At step 5, a check is performed to determine whether the change in the sine wave signal sin θ is equal to or smaller than a predetermined value. This change can be obtained by calculating the absolute value of the difference between the value of the sine wave signal sin θ at sampling time t0 (which was previously read at step S3), and the value of the sine wave signal sin θ at sampling time t1 (which is currently read at step S3). In this embodiment, a moving average value is employed as the change to take into account the effect of noise. For example, the sum of the data (S1 to S4) for the four points taken every 250 μSEC that were previously read at step S3 is divided by four, and the obtained value is employed as the previous value. The sum of the data (S5 to S8) for the four points taken every 250 μSEC that are read at the current step S3 is divided by four, and the obtained value is employed as the current value. Further, the absolute value provided by subtraction (the previous value−the current value) is calculated and employed as the change. That is, a calculation is performed to obtain the change per unit time. When the change is equal to or smaller than a predetermined value, the decision at step S5 is "YES", and the processing advances to step S6.

At step S6, the count held by the NG counter 44 is incremented in order to set NG=NG+1. The processing then advances to step S7 and a check is performed to determine whether the count held by the NG counter 44 is equal to or smaller than a predetermined value. Through this operation, it can be determined whether the change per unit hour has been accumulated for a designated period of time or longer. When the count held by the NG counter exceeds the predetermined value, the decision at step S7 is "NO" and it is determined a detection device fault has occurred. Since it is determined that a fault has occurred, the EPS function is halted and a warning lamp (WLP) is turned on.

When the count held by the NG counter 44 is equal to or smaller than the predetermined value, the decision at step S7 is "YES" and processing is then returned to the original routine and the processing is repeated anew. When the decision at step S1, S3 or S5 is "NO" or when the decision at step S4 is "YES", processing is also returned to the original routine and the processing is repeated anew.

An electric power steering apparatus employing the resolver (the rotation angle detection device) 10 will now be described while referring to the drawings.

Figure 3:
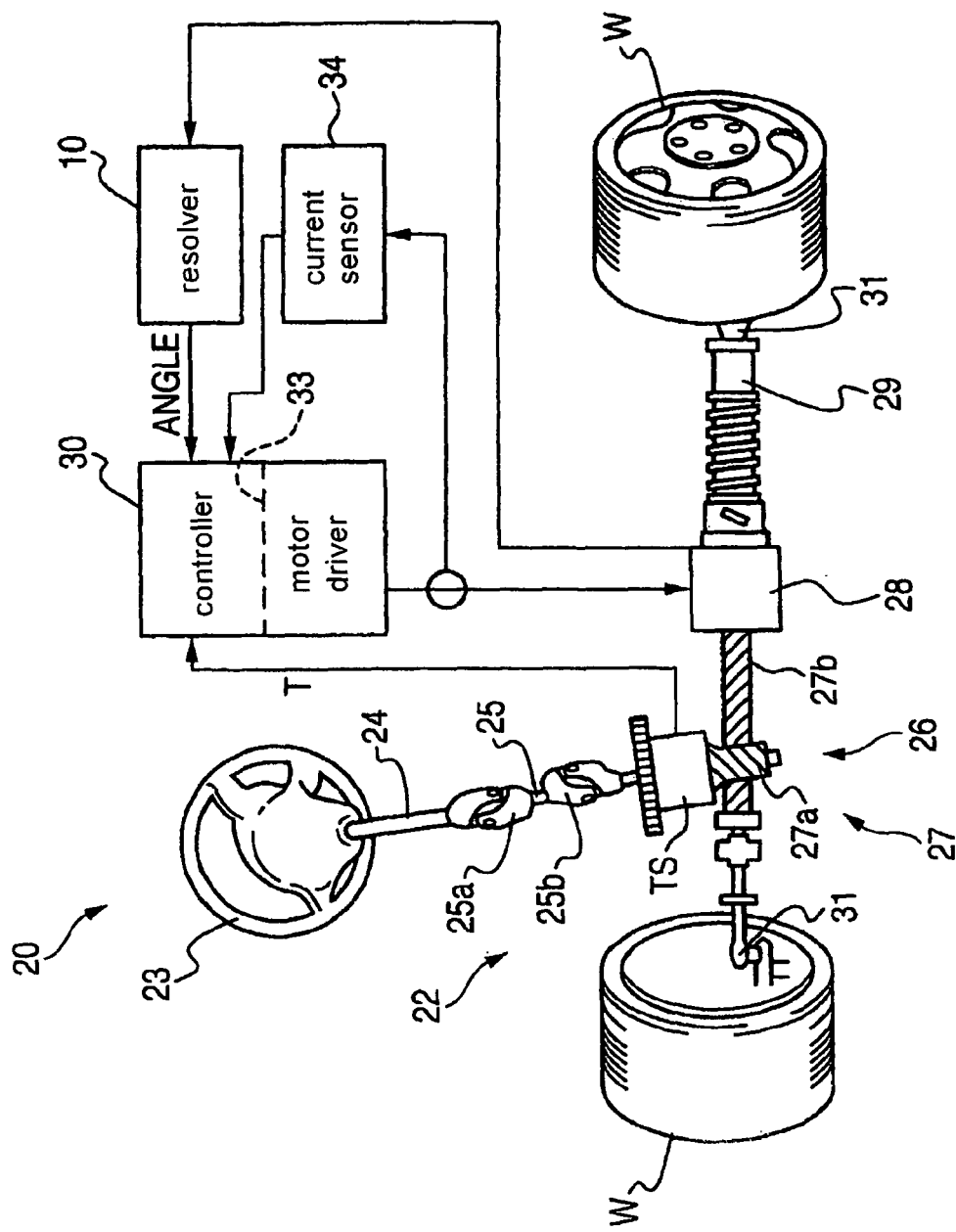
FIG. 3 is a diagram showing the structure of an electric power steering apparatus employing the rotation angle detection device of the first embodiment of the present invention.

FIG. 3 is a diagram showing the structure of an electric power steering apparatus 20. A steering shaft 24 is integrally formed with a steering wheel 23, and is coupled via a coupling shaft 25 equipped with adjustable joints 25a and 25b, with a pinion 27a of a rack and pinion mechanism 27 provided in a steering gear box 26. These components constitute a manual steering force generation section 22. Further, rack teeth 27b which engage the pinion 27a, and a rack shaft 29 which is reciprocated as a result of this engagement, move steered wheels W via tierods 31 provided at the two ends. Collectively, the mechanical sections which include the steering wheel 23, the steering shaft 24, the coupling shaft 25, the rack and pinion mechanism 27, the rack shaft 29, a motor 28 and the steered wheels W, are called a steering system.

The electric power steering apparatus 20 is so designed that a controller 30 includes a motor driver 33, which drives the motor 28 to generate auxiliary torque (an auxiliary steering force) to augment the manual steering force exerted by the manual steering force generation section 22.

A steering torque sensor TS for outputting a torque signal T, and the resolver 10 for outputting an angle signal ANGLE, are connected to the controller 30 and based on these signals, the controller 30 determines the magnitude and the direction of a current supplied to the motor 28. Further, a current sensor 34 for detecting the current that is supplied to the motor 28 by the motor driver 33, is also connected to the controller 30 and a detection signal is transmitted to the controller 30.

The steering torque sensor TS, arranged in the steering gear box 26, detects the magnitude and the direction of the manual steering torque attributable to a vehicle operator. In consonance with the detected steering torque, the steering torque sensor TS transmits an analog electric signal as torque signal T to controller 30. It should be noted that the torque signal T includes information indicating the steering torque magnitude and information indicating the direction in which the steering torque is applied. The torque direction is represented by using a positive value or a negative value of the steering torque; a positive value represents that the steering torque direction is to the right, and a negative value represents that the steering torque direction is to the left.

The motor driver 33 of the controller 30 supplies a current to the individual coils of the motor 28 via the pre-drive circuit and the FET bridge of the motor driver 33, in accordance, for example, with the duty of a PWM (Pulse Width Modulation) signal.

As described above, according to this embodiment, since the rotation angle detection device (the resolver) does not depend on the intensity of a sine wave signal or a cosine wave signal, an abnormality in either a sine wave or a cosine wave signal can be identified at a nearly time, at any point. Further, when this rotation angle detection device is employed in electric power steering apparatus 20, checking can be performed for an abnormality in the output of the resolver, and an abnormal operation such as vibration can be prevented.

Second Embodiment

In the first embodiment, either a sine wave signal or a cosine wave signal has been employed to perform an operation to determine whether an output abnormality has occurred. In the second embodiment, both a sine wave signal and a cosine wave signal can be employed to determine whether an output abnormality has occurred.

Figure 4A:
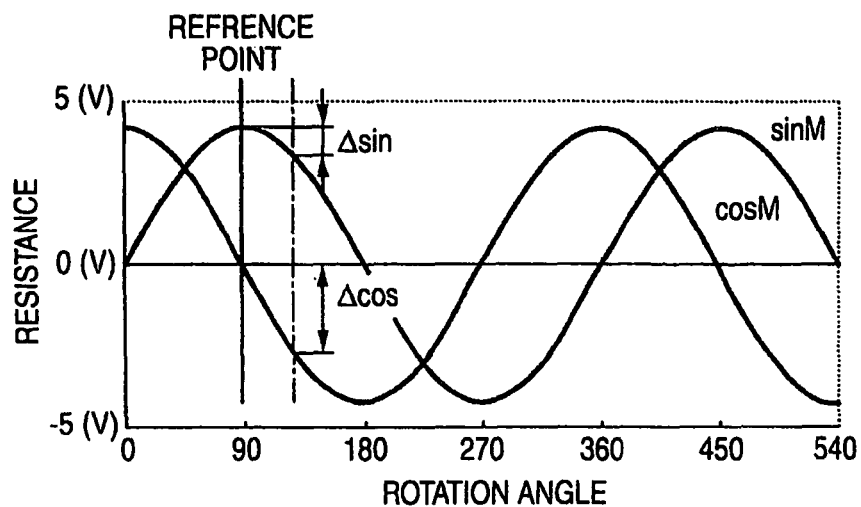
FIG. 4A is a graph showing a sine wave signal and a cosine wave signal according to a second embodiment of the present invention.

FIG. 4A is a graph showing a sine wave signal sin θ and a cosine wave signal cos θ. The horizontal axis represents the rotation angle of a motor 28, shown as ranging from 0 to 540 degrees. The vertical axis represents an output value having an amplitude of ±5V. Since the motor 28 is rotating, the horizontal axis corresponds to time. It should be noted that a reference point is designated as the point where $\theta_o=90$ degrees, i.e., the point where $\sin \theta_o=1$ and $\cos \theta_o=0$ is employed as the reference point.

Figure 4B:
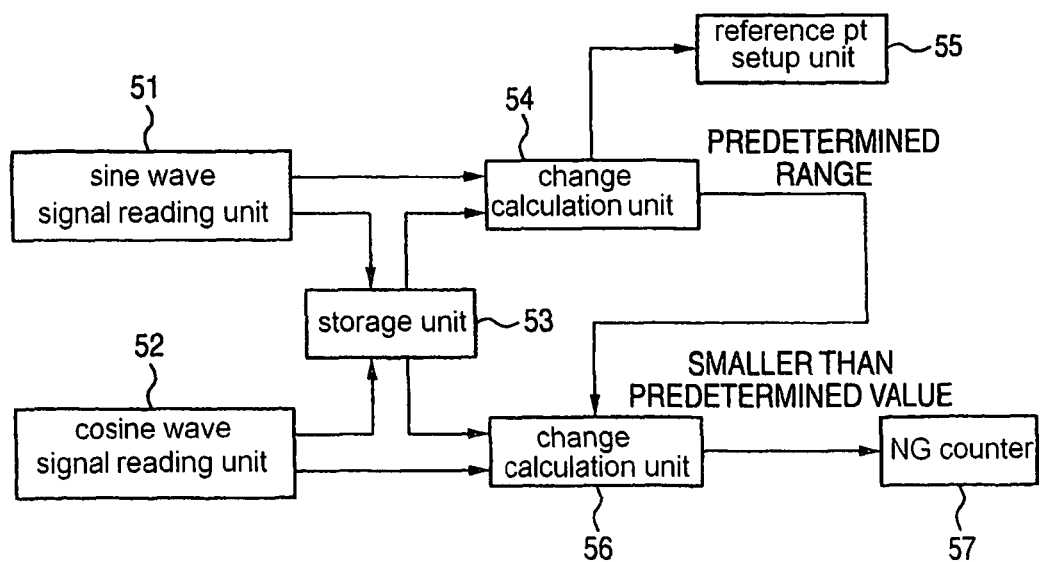
FIG. 4B is a graph showing an algorithm structure diagram according to a second embodiment of the present invention.

Since the hardware configuration for the second embodiment is the same as that for the first embodiment, no further explanation for it will be given. The algorithm structure for the second embodiment is shown in FIG. 4B. A sine wave signal reading unit 51 and a cosine wave signal reading unit 52 fetch a sine wave signal sin θ and a cosine wave signal cos θ, and store these signals in a storage unit 53. Further, a reference point setup unit 55 designates a reference point whereat sin θ=1 is established. After a predetermined period has elapsed following the time at which the reference point was determined, change calculation unit 54 compares a sine wave signal $\sin \theta_1$ which is newly read by the sine wave signal reading unit 51, with the sine wave signal $\sin \theta_0$ which is held in the storage unit 53. It should be noted that the reference point need only be designated so it is near sin θ=1, i.e., the reference point is designated as being a value within a range of ±300 mV, relative to the peak value of +5V.

The change calculation unit 56 calculates a change Δ cos θ for the cosine wave signal when a change Δ sin θ for the sin wave signal sin θ is 25 mV to 100 mV. When the obtained value is less than 50 mV, the count held by an NG counter 57 is incremented, and when the count held by the NG counter 57 exceeds a predetermined value, the state is determined to be "abnormal". For example, assume that reading is repeated at intervals of 1 mSEC, and the predetermined value is designated as 15. When the state wherein the change Δ cos θ is less than 50 mV is continued for 15 mSEC, this state is determined to be abnormal. That is, when the change in the cosine wave signal cos θ is small in an interval wherein the change in the sine wave signal sin θ is small, the state is determined to be abnormal.

As described above, according to this embodiment, when a sticking fault has occurred near the reference point of the sine wave signal sin θ, an operation for determining whether an output abnormality has occurred can be performed by employing the cosine wave signal cos θ. Further, as in the first embodiment, the resolver (the rotation angle detection device) of this embodiment can be employed in an electric power steering apparatus 20.

The present invention is not limited to these embodiments, and can be variously modified as follows.

Figure 5A:
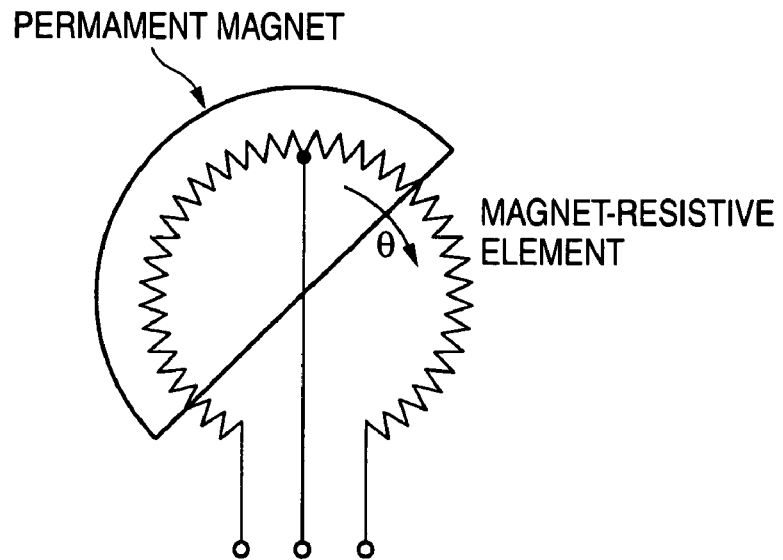
FIG. 5A is a diagram showing a non-contact potentiometer, which employs a permanent magnet and a magneto-resistive element.
Figure 5B:
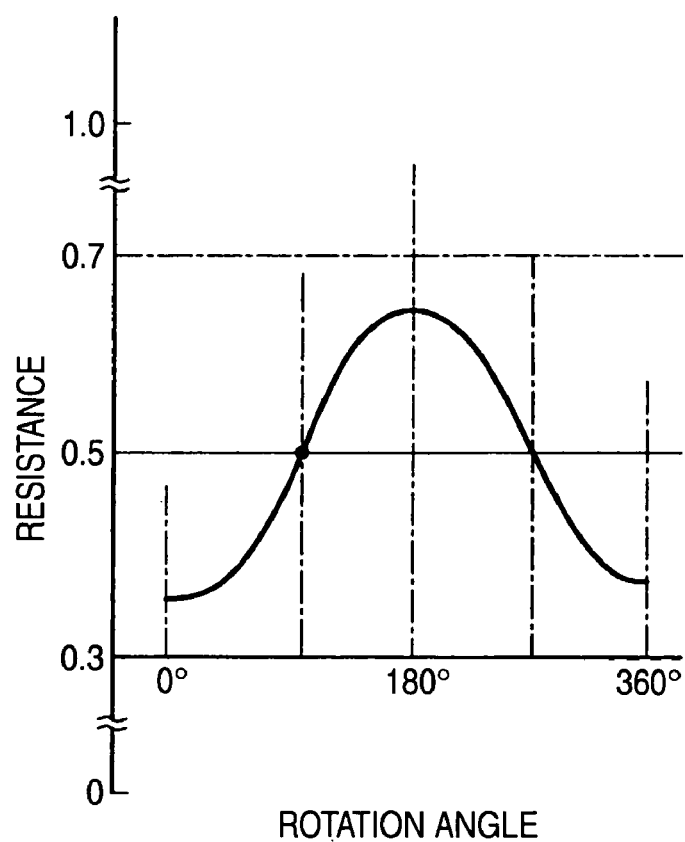
FIG. 5B is an output characteristic graph of the non-contact potentiometer according to FIG. 5.

(1) In the aforementioned embodiments, a sine wave signal or a cosine wave signal, for which a rotation angle has been changed, is obtained by connecting two secondary coils which intersect at a right angle to the primary coil across which a sinusoidal current is supplied. However, a sine wave signal can also be obtained by employing a magneto-resistive element fitted to the fixing shaft and a semi-circular permanent magnet attached to the rotor. For example, as described in Japanese Patent Publication No. 2000-39336 (cited above), a non-contact potentiometer shown in FIG. 5A may be employed. In accordance with the fluctuation in the magnetic field caused by the rotation of the permanent magnet, the electric resistance of the magneto-resistive element is changed and a sine wave signal shown in FIG. 5B is obtained. Further, when the non-contact potentiometer is mounted so that it is pivoted 90 degrees, a cosine wave signal is obtained.

(2) In the first embodiment at step S3, a check is performed to determine whether the motor rotational speed is within the designated range and at step S4, a check is performed to determine whether an area near sin θ=0 has been determined. These determination processes may be eliminated. For example, when a motor is constantly rotating, step S3 can be eliminated. When the area near sin θ=0 is not employed, step S4 can be eliminated.

(3) In the second embodiment, the process for determining whether an abnormality has occurred has been performed by employing the fact that a change in a cosine wave signal is great when a change in a sine wave signal is small. However, the process for determining whether an abnormality has occurred may also be performed by employing the fact that in the normal state an increase and a decrease in the changes are cyclically repeated.

(4) In each embodiment, in order to convert a rotation angle into a sine wave signal or a cosine wave signal, the two secondary coils that intersect at right angles are connected to the primary coil through which a sinusoidal current is supplied. A crank mechanism for converting rotational motion into linear motion may be employed to convert a change in position into a signal, and using this method, a sine wave signal or a cosine wave signal can be obtained.

(5) The electric power steering apparatus of this invention includes a Steer_By_Wire assembly in which the steering wheel 23 and the steered wheels W are mechanically separated. magneto-resistive element While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A rotation angle detection device comprising:
   a signal generating unit which generates a sine wave signal and a cosine wave signal as a rotary member is rotated;
   a rotation angle detection unit which detects a rotation angle of the rotary member, in accordance with at least one of the sine wave signal and the cosine wave signal; and
   an abnormal determining unit which determines whether an output abnormality has occurred in the rotation angle detection unit based on at least one of a change value in the sine wave signal per unit time and a change value in the cosine wave signal per unit time,
   wherein in a case that at least one of the change value in the sine wave signal per unit time and the change value in the cosine wave value signal per unit time is less than or equal to a predetermined value, the abnormal determining unit determines that the output abnormality has occurred.

2. The rotation angle detection device according to claim 1, wherein the abnormality is determined when the change value is beyond a predetermined range for more than a predetermined time.

3. The rotation angle detection device according to claim 2, wherein during determining the abnormality by using the sine wave signal and the cosine wave signal,
   when either the change value in the sine wave signal per unit time or the change value in the cosine wave signal per unit time is equal to or smaller than a first predetermined value,
   a check is performed to determine whether the change value in the other signal is equal to or greater than a second predetermined value.

4. The rotation angle detection device according to claim 1, wherein during determining the abnormality by using the sine wave signal and the cosine wave signal,
   when either the change value in the sine wave signal per unit time or the change value in the cosine wave signal per unit time is equal to or smaller than a first predetermined value,
   a check is performed to determine whether the change value in the other signal is equal to or greater than a second predetermined value.

5. An electric power steering apparatus for driving a motor in accordance with an externally inputted guidance and for providing auxiliary steering for a vehicle comprising:
   a steering wheel to which a manual steering torque is inputted;
   a motor which is driven by a power source in accordance with the manual steering torque so as to enhance the manual steering torque; and
   the rotation angle detection device according to claim 1 for detecting the rotation angle of the motor.

* * * * *